United States Patent
Van Gageldonk et al.

(10) Patent No.: US 6,948,158 B2
(45) Date of Patent: Sep. 20, 2005

(54) RETARGETABLE COMPILING SYSTEM AND METHOD

(75) Inventors: Johan Sebastiaan Henri Van Gageldonk, Eindhoven (NL); Marco Jan Gerrit Bekooij, Eindhoven (NL); Adrianus Josephus Bink, Chicago, IL (US); Jan Hoogerbrugge, Eindhoven (NL); Jeroen Anton Johan Leijten, Eindhoven (NL); Bart Mesman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 633 days.

(21) Appl. No.: 09/969,094

(22) Filed: Oct. 2, 2001

(65) Prior Publication Data

US 2002/0042909 A1 Apr. 11, 2002

(30) Foreign Application Priority Data

Oct. 5, 2000 (EP) .......................................... 00203467

(51) Int. Cl.[7] .............................................. G06F 9/45
(52) U.S. Cl. ................................................... 717/140
(58) Field of Search ............................... 717/136–151; 712/1.24, 200

(56) References Cited

U.S. PATENT DOCUMENTS

| | | | |
|---|---|---|---|
| 5,933,642 A | | 8/1999 | Greenbaum et al. ........ 717/136 |
| 6,026,479 A | | 2/2000 | Raje et al. |
| 6,557,094 B2 | * | 4/2003 | Pechanek et al. ........... 712/209 |
| 6,640,315 B1 | * | 10/2003 | Hwu et al. ..................... 714/17 |
| 6,691,305 B1 | * | 2/2004 | Henkel et al. ............... 717/136 |
| 6,718,539 B1 | * | 4/2004 | Cohen et al. ................ 717/136 |
| 6,728,950 B2 | * | 4/2004 | Davis et al. ................. 717/136 |

OTHER PUBLICATIONS

Nakatani et al. Combining as a compilation techniques for VLIW architectures. ACM. 1990. pp. 43–55.*
Ebcioglu et al. Dynamic binary translation and optimization. IEEE. 2001. pp. 529–548.*
Rajagopalan et al. A retargetable VLIW compiler framework for DSPs with instruction–level parallelism. IEEE. 2001. pp. 1319–1328.*
Biglari–Abhari et al. Improving binary compatibility in VLIW machines through compiler assisted dynamic rescheduling. IEEE. 2000. pp. 386–393.*

* cited by examiner

*Primary Examiner*—Wei Y. Zhen
(74) *Attorney, Agent, or Firm*—Michael Ure

(57) ABSTRACT

The present invention relates to a compiling method and system for generating a sequence of program instructions for use in a processing architecture with architecture resources executing instructions from a corresponding instruction set. A retargetable compiler is used to generate a code using at least two instruction sets in the same processing architecture. One instruction set for a compact code and one for a parallel high performance code. The compact instruction set (Compact Instruction Format) covers a subset (RF1[1], ALU1, L/S1, BU1) of the architecture, whereas the complete instruction set covers the entire architecture (RF1, UC1, UC2, RF2, UC3, UC4, RF3, UC5, UC6, RF4, UC7). By using the at least two instruction sets of different sizes, the compiler is able to reduce the processed average code length, since fewer bits are needed in the compact code to encode operations and registers.

14 Claims, 2 Drawing Sheets

Compact Instruction Format

RETARGETABLE COMPILING SYSTEM AND METHOD

Figure 1:
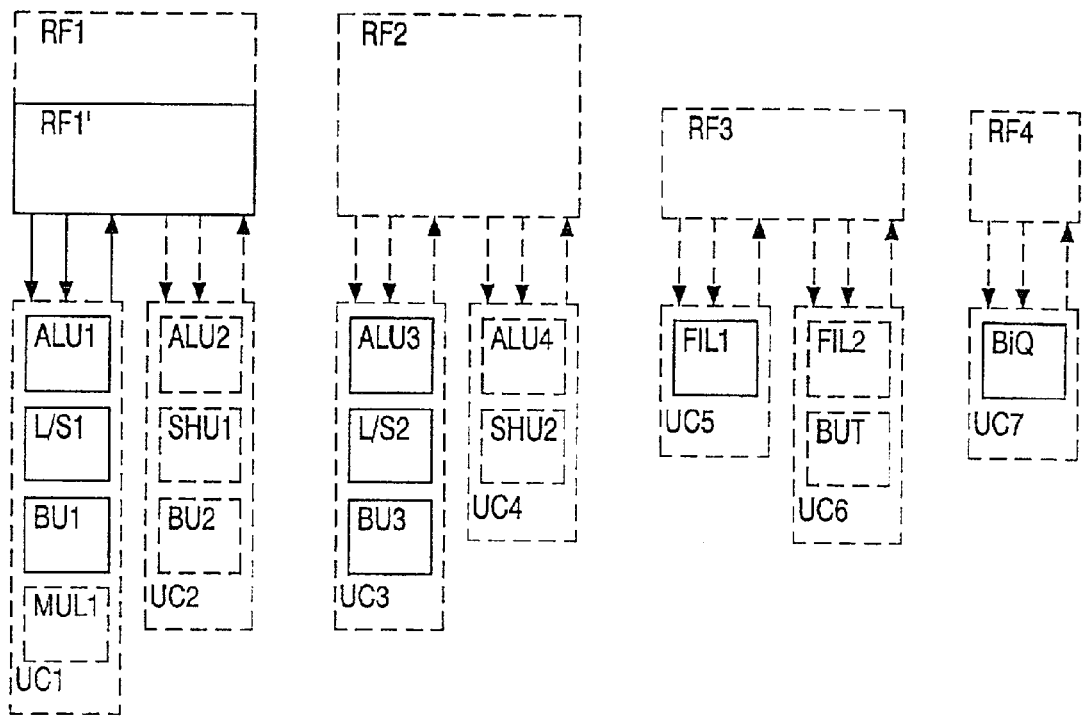

The present invention relates to a compiling method and system for generating a sequence of program instructions for use in a processing architecture with architecture resources executing instructions from a corresponding instruction set, as defined in claims 1 and 12, respectively. Furthermore, the present invention relates to a computer program product as defined in claim 14.

The development of high performance DSPs, mainly has been directed to an increase of the processing power. This may be achieved either by providing higher processor clock-rates or by adding further arithmetic units (i.e. parallelization). The latter approach is based on parallel processing of a plurality of partial tasks within a program section, and can be achieved by using a so-called "Very Long Instruction Word" (VLIW) processor. According to the VLIW concept, several processing units are integrated on the same chip to thereby achieve a powerful processing machine which is controlled by a very long instruction word. Such a parallel instruction word includes individual instructions for individual processing units. The challenge of such an approach is to split an algorithm into partial tasks which can be performed in parallel on this architecture. These partial tasks are distributed to the individual processing units under strict consideration of the process timing, to thereby achieve a constant duty rate of each unit. This can be achieved by a so-called scheduling action which may be formed by an intelligent compiler.

Codes for Digital Signal Processors (DSPs) can be classified in two classes: regular, computation-intensive and time-critical codes, and irregular administrative codes which are less time-critical. The regular codes usually need to exploit the complete parallelism available in the processors datapath to meet the timing requirements. In contrast, administrative codes in general only need a subset of the datapath to meet the timing requirements.

A VLIW compiler can exploit the parallelism available in the datapath by scheduling the operations as much in parallel as possible. However, a disadvantage is the large code size of VLIW instructions. Especially for administrative codes, which constitute a large part (often 80%) of the total number of instructions, it is disadvantageous to use the complete VLIW instruction set.

Document U.S. Pat. No. 5,933,642 discloses a compiling system and method as defined in the preambles of claims 1 and 12. In particular, a dynamically reconfigureable processing unit is described having an internal hardware organization that is selectively changeable among a plurality of hardware architectures, each hardware architecture executing instructions from a corresponding instruction set. A hardware organization is dedicated and optimized for the implementation of a particular Instruction Set Architecture (ISA). The ISA is implemented with a unique internal hardware organization as specified by a corresponding configuration data set. Upon selection of a given reconfiguration directive, program instructions are subsequently executed according to a corresponding ISA via a unique configuration as specified by the bit stream referenced by the configuration directive. A compiler reads source files containing source code instruction statements from a disk storage or from some other input or storage device. Then, the compiler identifies an ISA for a subset of source code instruction statements, generates appropriate reconfiguration instructions for specifying the identified ISA and compiles the subset of instructions for execution by the identified ISA, to create assembly language statements. However, such a dynamical reconfiguration of hardware organizations is only possible in architectures employing field programmable gate arrays (FPGAs), and requires a continuous modification of the hardware architecture.

It is therefore an object of the present invention to provide a compiling method and system by means of which the code efficiency can be increased, without requiring substantial modifications of the hardware architecture.

This object is achieved by compiling a method as defined in claim 1, and a compiling system as defined in claim 12. Furthermore, this object is achieved by a computer program product as defined in claim 14.

Accordingly, two views are provided on the processors resources, i.e. a compact instruction set used for accessing only a part of the complete datapath, and a complete instruction set for providing access to the complete datapath required for time-critical, parallel codes. Thereby, the retargetability aspect is used to generate an instruction code using different instruction sets for the same processing architecture. The difference in the two instruction sets is the view of the compiler on the architecture resources when generating instruction codes using either of the instruction sets. With this scheme, the same retargetable compiler tools can be used to compile source code instructions using the two different instruction sets.

The code instruction statements may be C-language statements. In this case, only those functional units which are necessary for the C-language need to be controllable. Thereby, opcode bits for the functional unit cluster can be saved. Furthermore, the processing architecture may be a VLIW DSP architecture. Due to the fact that the VLIW instruction format consists of a concatenation of a plurality of issue slots, a simple conversion between the compact instruction set and the first instruction set can be achieved.

According to an advantageous development of the present invention, the first kind of instruction statement may be a code which does not need to use full processor parallelism, and the second kind of instruction statement may be a parallel code. Thus, a switching may be performed between the two instruction sets, each time when there is a change between the time-critical parallel code and the administrative code. The compiler deals with these two instruction sets to exploit the code-size advantage of the smaller instruction set, and the performance-advantage of the larger instruction set.

According to another advantageous development, the subset of architecture resources corresponds to a part of the whole datapath of the processing architecture. In particular, the part of the whole datapath may comprise only one functional unit cluster of the processing architecture. In this case, a straight forward decoding of the second or compact instruction set to the VLIW format can be achieved by simply copying the instruction bits of the compact instruction into the issue slot of the corresponding functional unit.

According to another advantageous development, the compiling steps are performed by using a first machine description file for the first kind of instruction statements and by using a second machine description file for the second kind of instruction statements, wherein the second machine description file defines available operations of the subset of architecture resources. In view of the fact that the compact instruction set merely views a subset of the datapath seen by the complete instruction set, it is straight forward to express this in an additional machine description file. Thereby, one single retargetable compiler can be used for generating assembly codes for two views of the architecture using the two different machine description files.

According to a further advantageous development, program instructions generated by using the compact instruction set are decoded after the compiling steps into the format of the first instruction set by copying the instruction bits of the compact instruction to corresponding positions of an issue slot of the format of the first instruction set and filling other issue slots with bit values indicating that these slots are not used. That, a simple decoding operation for decoding compact instructions into the format of the first instruction set can be achieved. Preferably, the first instruction set may be a VLIW instruction set.

According to a further advantageous development, the compact instruction set is applied in such a manner that the result of an operation is written back to the same register location from which one of the operands was fetched. This usage of "destructive" register operands leads to the advantage that register address bits are saved, since for many instructions only two instead of three operand/result addresses need to be specified.

According to a further advantageous development, the compact instruction set may be adapted in such a manner that only a subset of registers of a single register file is used. Thereby, the number of register address bits required in the compact instructions can be reduced to thereby reduce the instruction width of the compact instruction set. Preferably, the compact instruction set is adapted to comprise short immediate formats and at least a limited number of guarded operations. These measures lead to a further reduction of the instruction width of the compact instruction set.

Figure 2:
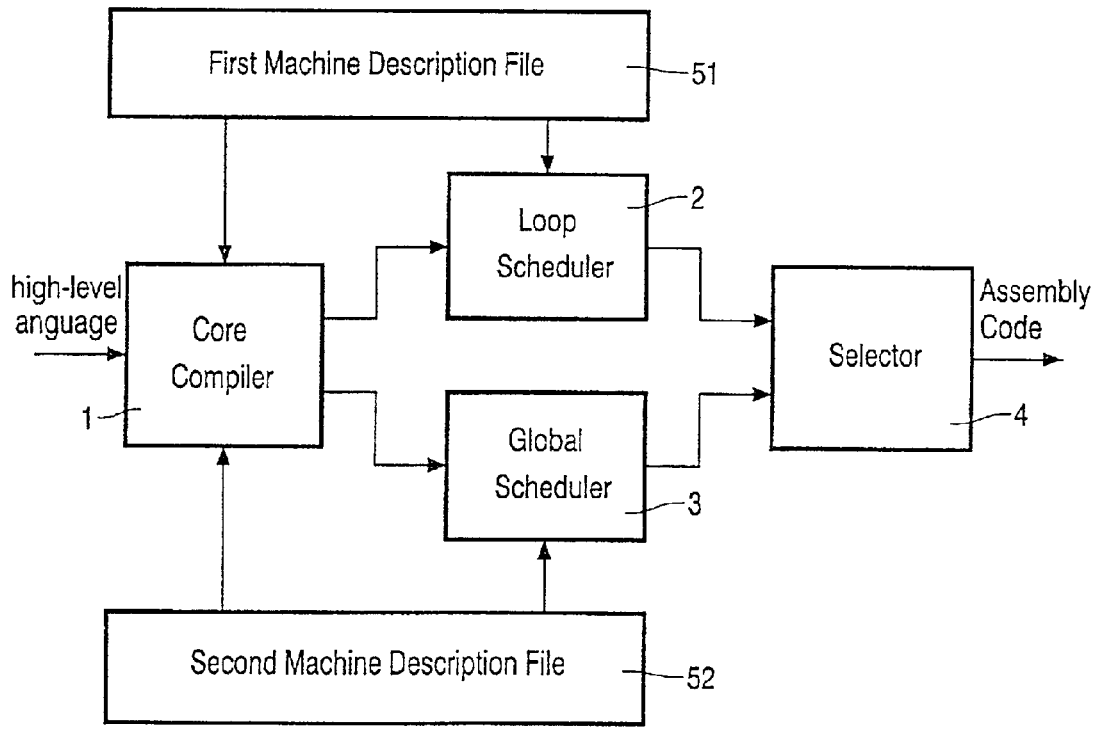
Figure 3:
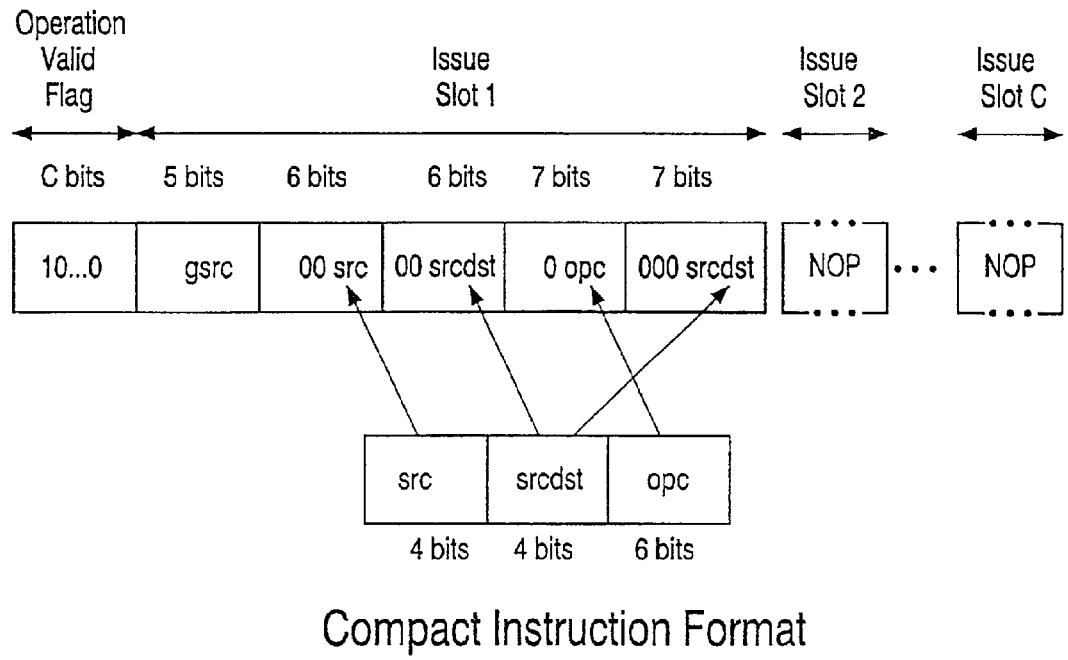
Figure 4:
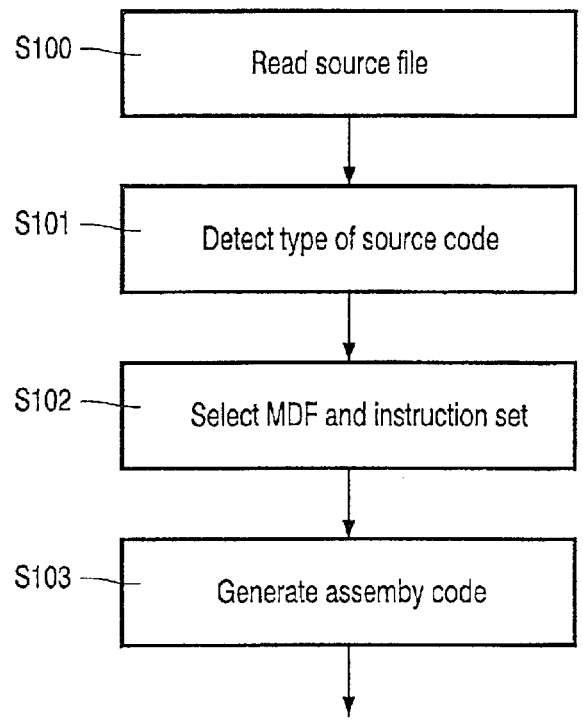

In the following, a preferred embodiment of the present invention will be described with reference to the accompanying drawings of which:

FIG. 1 shows a basic diagram indicating datapaths in a dual instruction set DSP architecture according to the preferred embodiment, FIG. 2 shows a basic block diagram of a retargetable compiler according to the preferred embodiment, FIG. 3 shows a diagram indicating an example for decoding of a compact instruction to a VLIW format according to the preferred embodiment, and FIG. 4 shows a principal flow diagram of a compiling method for a retargetable compiler according to the preferred embodiment.

The preferred embodiment will now be described on the basis of a datapath of a dual instruction set VLIW processor with partitioned register files.

FIG. 1 shows a basic block diagram of the datapath in the DSP architecture, wherein two different machine views of the same datapath instants are indicated. In the compact view (solid lines) only a small part of the datapath is used, while the whole datapath (solid and broken lines) is used in the complete or parallel view.

According to FIG. 1, the architecture comprises seven functional unit clusters UC1 to UC7, wherein each functional unit cluster comprises at least one functional unit having a parametrizable number of operand input ports and result output ports. In FIG. 1, two operand input ports and one result output port are indicated for each of the functional unit clusters UC1 to UC7 for reasons of simplicity. With every functional unit, a set of operation types can be associated. This set expresses the specific operations that the functional unit can execute. Via an instruction or op-code supplied to the functional unit cluster and to the functional unit, an operation from the operation type set can be selected. It is noted that operations with different operand sampling times and different result production times may share functional unit input/output ports and thus also functional unit cluster input/output ports. Possible resource conflicts which may occur due to this sharing of ports need to be resolved by the compiler. Therefore, in the compiler, with every operation type one or more resource usage patterns are associated, wherein the usage of different resources over time is expressed. The compiler takes these patterns into account to construct a conflict-free schedule of operations. From a compiler point of view, it is irrelevant whether operation types belong to the same functional unit or not. In FIG. 1, the first functional unit cluster UC1 comprises a first arithmetic logical unit ALU1 for performing arithmetic and logical operations, a first load/store unit L/S1 for performing loading and storing operations, a first branch unit BU1 required for performing branching operations, and a multiplication unit MUL1 for performing multiplication operations. The second functional unit cluster UC2 comprises three functional units, i.e. a second arithmetic logical unit ALU2, a first shift unit SHU1 and a second branch unit BU2. Furthermore, the third functional unit cluster UC3 comprises three functional units, i.e. a third arithmetic ALU3, a second load/store unit L/S2 and a third branch unit BU3, the fourth functional unit cluster UC4 comprises two functional units, i.e. a fourth arithmetic logical unit ALU4 and a second shift unit SHU2, the fifth functional unit cluster UC5 comprises a single functional unit, i.e. a first filter section FIL1 for performing a filter operation of a DSP algorithm, the sixth functional unit cluster UC6 comprises two functional units, i.e. a second filter section FIL2 and another branch unit BUT, and the seventh functional unit cluster UC7 comprises a single functional unit, i.e. a bi-quad unit BiQ for supporting a bi-quad filter as a special kind of filter.

Each functional unit cluster corresponds to an operation issue slot of the processor core and contains a parametrizable number of functional units. In every cycle, at most one operation can be started on one of the functional units in the cluster. When an operation is started on a functional unit, the functional unit will sample the operands for the operation from its input ports. To reduce hardware complexity, it is assumed that all functional units in a functional unit cluster share the input ports. A new operation can be started on a functional unit cluster as long as no conflicts on input ports occur. If the output ports of the functional units are shared, the compiler must prevent conflicts from occuring and should take possible conflicts into account when determining the start times of the operation. An alternative solution is that the operations are able to produce results at the output of the cluster simultaneously. In this case, functional units with different latencies cannot share their output ports, which means that the number of required functional unit cluster outputs must be equal to the maximum number of results that can be produced by the cluster in a single cycle. Depending on the application requirements, either sharing or no sharing can be applied in the processor architecture.

According to FIG. 1, the first and second functional unit clusters UC1 and UC2 share a first register file RF1, the third and fourth functional unit clusters UC3 and UC4 share a second register file RF2, the fifth and sixth functional unit clusters UC5 and UC6 share a third register file RF3, and the seventh unit cluster UC7 is connected to a fourth register file RF4. Each of the register files RF1, RF2, RF3 and RF4 contains a number of physical registers into which the values of variables can be stored. These physical registers can be organized within the register file as static random access registers, i.e. physical registers addressed by a unique fixed register index, as rotating registers, i.e. physical registers addressed by adding a register index offset to a global register index base modulo the size of the rotating buffer the register belong to, as broadcast (or multicast) registers, i.e. static random access registers sharing a register address with broadcast registers in other register files, as FIFO (First-In-First-Out) registers, i.e. physical registers addressed by a common register index for a whole FIFO buffer consisting of different physical registers, or as stack registers, i.e. physical registers addressed by a common register index for a whole stack buffer consisting of different physical registers. Each of the register files RF1, RF2, RF3 and RF4 may as well contain any combination of the above organization types. Each register file has write ports and read ports, wherein each write port may consist of a write enable input and a write register index input to select one or a group of registers in the file, and a write data input via which the result data are written into the register file.

In the dual instruction set architecture according to FIG. 1, two instruction sets are used. In order not to increase the complexity of the core and of the compiler, both instruction sets share the datapath resources, use the same basic instruction decoder, and use the same compiler tools. The difference in the two instruction sets lies in the view that the compiler has on the architecture resources when generating code using either of the instruction sets. With this scheme, the same retargetable compiler tools can be used to compile code using two different instruction sets. In particular, a compact instruction set is used for a code which does not need to use full processor parallelism, e. g. the administrative code, wherein the compact instruction set is arranged to access only a part of the complete datapath indicated by the solid blocks. That is only the first function unit cluster UC1, in particular the functional units ALU1, L/S1, and BU1, and the part RF1' of the register files are visible or usable by the compact instruction set, i.e. for the administrative code. The second instruction set is a complete instruction set for the time-critical parallel code, wherein all functional units and register files are viewed or used by the time-critical, parallel code. In extreme cases, a switching has to be performed between these two instruction sets on a fine-grained level, each time a switch between the time-critical and administrative codes occurs. In practice, this level of switching may be on a functional level, i.e. on basic block or decision tree level. A single compiler is desirable for reasons of reuse, shorter time-to-market, and better maintainability of the compiler code. Such a single compiler is arranged to make use of these two instruction sets in order to exploit the code-size advantage of the small or compact instruction set and the performance-advantage of the large instruction set. Thus, according to the preferred embodiment, the retargetability aspect is used to generate an assembly code using different instruction sets of the same processor architecture.

FIG. 2 shows a basic block diagram of the retargetable compiler according to the preferred embodiment. The processor architecture is arranged as a template with a parametrizable number of functional unit clusters, functional units per cluster, buses, register files, and register file structures. In order to be able to cope with these parameters efficiently, both the hardware description has to be parametrizable and the software development environment has to be retargetable. As a bridge between the hardware architecture and the software development tools, first and second machine description files 51 and 52 for the complete datapath and the reduced datapath, respectively, are provided. These files contain information about the architecture instance under consideration. The first and second machine description files 51 and 52 specify the resource usage of the custom operations by an abstract notion of resources with which buses, ports, etc. can be modelled.

According to FIG. 2, the compiler comprises a core compiler 1 which translates an input high-level language (e.g. C/C++ program) into an intermediate format. The core compiler consists of a front end containing a scanner, a parser, and a semantic checker. Furthermore, the core compiler 1 implements many optimization algorithms, and a code selector. The optimizations in the core compiler are to a large extent independent of the target architecture. They may comprise loop-unrolling, function-inlining, alias analysis, constant folding, constant-propagation, common-subexpression elimination, and global code motion. The core compiler 1 may be arranged to supply the administrative, less regular code to a global scheduler 3, and the time-critical and regular loop or parallel code to a loop scheduler 2. The global scheduler 3 schedules the administrative, less regular code which is typically not time-critical and contains limited or no parallelism. The administrative code is often a code for initialization or control tasks. The loop scheduler 2 is arranged to schedule the time-critical and regular loop or parallel code, typically encountered in DSP applications. This code typically contains a lot of parallelism. The operations of the core compiler 1, the loop scheduler 2 and the global scheduler 3 are performed on the basis of a respective information obtained from the first and second machine description file 51 and 52. The final sequence of the assembly code is then selected from the output of the loop scheduler 2 and the global scheduler 3 by a selector 4.

During the compiling operation, the core compiler 1 selects either the first machine description file 51 covering the complete datapath, when the loop or parallel code is compiled by using a complete instruction set, or selects the second machine description file 52 covering the reduced datapath, when the administrative code is compiled by using the compact instruction set. The global scheduler 3 receives the compact output of the core compiler 1 and schedules the compact operations into compact instructions based on the second machine description file 52 and the compact instruction set. After initialization, which includes parsing the second machine description file 52, the global scheduler 3 starts parsing decision trees from the input file, scheduling them, and writing the result to an assembly output file.

Because of the periodic character of DSP calculations, loops often occur in DSP-code, in which the actual signal processing is done. These loops usually have a regular shape and are considered to be time-critical. These DSP-loops are scheduled by the loop scheduler 2. Generally speaking, DSP-loops demand a high throughput. Therefore, the loop scheduler 2 tries to exploit the complete available parallelism in the datapath by using the first machine description file 51 and the complete instruction set. The loop scheduler 2 may take decisions in the same fashion as a list-scheduler would do, but it has the possibility for backtracking on false decisions. Before and during scheduling, the search space for the scheduler may be reduced using constraint analysis as a key technique. The constraint analysis effectively reduces the search space of the scheduler without eliminating any feasible solution. It eliminates schedule decisions that will lead to infeasible results. However, constraint analysis is not the only method to deal with the challenge of generating optimal scheduled DSP-loops. Other techniques such as iterative modulo scheduling, integer-linear programming (ILP), or heuristics may be employed to deal with the challenge of scheduling DSP-loops.

It is noted that the global scheduler 3 may as well schedule time-critical non- or less regular codes. In this case, the global scheduler 3 is capable of exposing instruction level parallelism by performing compile-time speculation. Thereby, it may produce a parallel schedule. Thus, in general, the global scheduler 3 and the loop scheduler 2 may both be able to access both first and second machine description files 51 and 52.

The selector 4 then selects the respective assembly codes from the assembly output files of the loop scheduler 2 and the global scheduler 3 in order to obtain the correct sequence of assembly codes.

Thus, all instruction sets share the datapath resources and compiler tools. In the complete or parallel instruction set, all hardware resources are visible to and can be used by the compiler. In the compact instruction set, only the functional units ALU1, L/S1 and BU1 of the first functional unit cluster UC1 are visible. Furthermore, only the part RF1' of the first register file RF1 are visible. Additional instruction bits can be saved by using a stack buffer in the first register file RF1 and making the instruction set at least partly stack-based with respect to the data access. The minimum requirement for the compact instruction set is that it supports all operations necessary to compile the high-level language, e.g. the C/C++ language. To satisfy this minimum requirement, the functional units ALU1, L/S1 and BU1 are sufficient.

In view of the fact that only one functional unit cluster UC1 is used, no instruction headers are necessary for $VL^2IW$ instructions (variable length VLIW instructions) in the parallel instruction set. Furthermore, since only a subset of functional units of the first functional unit cluster UC1 are used, op-code bits can be saved for the functional unit cluster. A further reduction of the instruction code bits can be achieved due to the fact that only a subset of the registers of the first register file RF1 needs to be addressable. This reduces the number of register address bits required in the compact instructions.

The instruction width of the compact instruction can be further reduced by using short or shorter immediate formats in the instructions, and by using no or only a limited number of guarded operations such that bits necessary to address a guard operand can be saved. Moreover, register address bits can be saved by using "destructive" register operands, which means that the result of an operation is written back to the same register location from which one of the operands was consumed or fetched. Thereby, only two instead of three operand/result addresses need to be specified.

The compact instruction set can be designed such that a decoding into the VLIW format applied to the functional unit clusters UC1 to UC7 can be achieved in a simple manner. FIG. 3 shows an example for a compact instruction format and its decoding to the VLIW format. The compact instruction format does not support guarded operations and uses destructive operands. In particular, it may consist of 14 bits of which 4 bits are used for addressing a source register src, 4 bits are used for addressing a "destructive" register srcdst, and 6 bits are used for the op-code opc. The complete instruction format is a VLIW format comprising a number C of issue slots for each functional unit cluster, and an initial field of operation valid flags indicating valid functional unit clusters to be used by the instruction. In the case shown in FIG. 1, the VLIW format comprises issue slots 1 to C. Each issue slot consists of a 5-bit field used for a constant TRUE value gsrc, a field of 6 bit used for addressing a source register, a field of 6 bit used for addressing another source register, a field of 7 bit used for an op-code, and a field of 7 bits used for addressing a destination register. According to FIG. 3, a simple decoding operation can be achieved by copying the address bits of the source register src of the compact instruction format to the address field of the source register of the VLIW format, by copying the address bits of the "destructive" register srcdst of the compact instruction format to the other source address field of the VLIW format and to the address field of the destination register, and by copying the op-code opc of the compact instruction format to the op-code field of the VLIW format. The remaining bit positions are filled with 0 bits. Since the other issue slots are not used in the compact instruction format, they are filled so as to indicate a no operation function (NOP) of the respective functional unit cluster. This is also indicated in the operation valid flags at the start of the VLIW format.

FIG. 4 shows a principle flow diagram of a compiling method for a retargetable compiler according to the preferred embodiment. Initially, in step S100, the core compiler 1 reads a source file of a high-level language. During the translation of the high-level language into the intermediate format, the core compiler 1 detects the type of source code, i.e. an administrative code or a time-critical, parallel code (step S101). Based on the detected type of source code, the core compiler selects either the first machine description file 51 and uses the complete instruction set, or the second machine description file 52 and uses the compact instruction set (step S102). Based on the selection operation, the intermediate format is supplied to the loop scheduler 2 or the global scheduler 3, which generate a corresponding sequence of assembly codes (step S103). The final sequence of the assembly code is then obtained from the selector 4 which combines the assembly codes obtained from the loop scheduler 2 and the global scheduler 3 according to their sequential order.

Thus, only minor modifications to the architecture or the compiler are required to support the dual instruction set concept. However, by using the compact instruction set, the compiler is able to generate smaller instruction codes, since fewer bits are needed to encode operations and registers. Thereby, an assembly code is generated which is optimized While the invention has been described in conjunction with the preferred embodiment, it is evident to those skilled in the art that many further alternatives, modifications and variations will be apparent in the light of the foregoing description. In particular, the invention can be applied to any parallel DSP architecture comprising plural functional units or functional unit clusters. Furthermore, the present invention can be applied to any kind of processing architecture where the processing resources can be limited by defining a specific instruction set. Moreover, the present invention is intended to cover any computer program product (such as a record carrier on which a corresponding program is stored, or a software product which can be downloaded from a communication network) suitable to adapt a computer so as to perform the compiling steps covered by the present invention.

Thus, the invention described herein is intended to embrace all such alternatives, modifications, applications and variations within the scope of the appended claims.

What is claimed is:

1. A compiling method for generating a sequence of program instructions for use in a processing architecture with architecture resources executing instructions from a corresponding instruction set, said method comprising the steps of: inputting a source file comprising a plurality of source code instruction statements including at least a first kind of instruction statements and a second kind of instruction statements; selecting at least a first instruction set and a second instruction set for said first kind of instruction statements and said second kind of instruction statements, respectively; and compiling said first kind of instruction statements using said first instruction set (VLIW format) and compiling said second kind of instruction statements using said second instruction set, characterized in that said first and second instruction sets are adapted to be used in the same processing architecture, and said second instruction set (Compact Instruction Format) is a compact instruction set designed to support only a subset of the architecture resources supported by the first instruction set; whereby a single compiler is used to generate both VLIW format and Compact Instruction Format programs used in the same processing architecture.

2. A method according to claim 1, characterized in that said code instruction statements are C-language statements.

3. A method according to claim 1, characterized in that said processing architecture is a VLIW DSP architecture.

4. A method according to claim 1, characterized in that said first kind of instruction statement is a code which does not need to use full processor parallelism, and said second kind of instruction statement is a parallel code.

5. A method according to claim 1, characterized in that said subset of architecture resources (RF1$^1$, ALU1, L/S1, BU1) corresponds to a part of the whole datapath (RF1, UC1, UC2, RF2, UC3, UC4, RF3, UC5, UC6, RF4, UC7) of said processing architecture.

6. A method according to claim 5, characterized in that said part of the whole datapath comprises only one functional unit cluster (UC1) of said processing architecture.

7. A method according to claim 1, characterized in that said compiling steps are performed by using a first machine description file for said first kind of instruction statements and by using a second machine description file for said second kind of instruction statements, wherein said second machine description file defines available operations of said subset (RE1.sup.1, ALU1, L/S1, BU1) of architecture resources.

8. A method according to claim 1, characterized in that program instructions generated by using said compact instruction set are decoded after said compiling steps into the format of said first instruction set by copying the instruction bits of said compact instruction to corresponding positions of an issue slot of said format of said first instruction set and by filling other issue slots with bit values indicating that these slots are not used.

9. A method according to claim 1, characterized in that said compact instruction set is adapted in such a manner that the result of an operation is written back to the same register location from which one of the operands was fetched.

10. A method according to claim 1, characterized in that said compact instruction set is adapted in such a manner that only a subset of registers (RF1$^1$) of a single register file (RF) is used.

11. A method according to claim 1, characterized in that said compact instruction set comprises short immediate formats and no or only a limited number of guarded operations.

12. A computer program product which can be loaded into a memory of a computer, wherein said computer is adapted to perform the steps defined in claim 1, when said computer program product is run on said computer.

13. A compiling system for generating a sequence of program instructions for use in a processing architecture with architecture resources executing instructions from a corresponding instruction set, said system comprising: an input device for inputting a source file comprising a plurality of source code instruction statements including at least a first kind of instruction statements and a second kind of instruction statements; and a compiler, coupled to receive said source file from said input device, for selecting at least a first instruction set (VLIW format) and a second instruction set (Compact Instruction format) for said first kind of instruction statements and said second kind of instruction statements, respectively, for compiling said first kind of instruction statements using said first instruction set, and for compiling said second kind of instruction statements using said second instruction set, characterized in that said first and second instruction sets are adapted to be used in the same processing architecture; and said second instruction set is a compact instruction set adapted to support only a subset of the architecture resources supported by the first instruction set; whereby a single compiler is used to generate both VLIW format and Compact Instruction format programs used in the same processing architecture.

14. A system according to claim 13, characterized in that said compiling system is used in a VLIW DSP architecture.

* * * * *